(12) United States Patent
Tuffile et al.

(10) Patent No.: US 8,474,499 B2
(45) Date of Patent: Jul. 2, 2013

(54) PUNCTURE RESISTANT TIRE (75) Inventors: Charles D. Tuffile, Dighton, MA (US);
David P. Paratore, Warren, RI (US);
Daniel James Branagan, Idaho Falls, ID (US)

(73) Assignee: The NanoSteel Company, Inc., Providence, RI (US)

( * ) Notice: Subject to any disclaimer, the term of this patent is extended or adjusted under 35 U.S.C. 154(b) by 0 days.

(21) Appl. No.: 13/412,342

(22) Filed: Mar. 5, 2012

(65) Prior Publication Data

US 2012/0222789 A1 Sep. 6, 2012

Related U.S. Application Data (60) Provisional application No. 61/449,335, filed on Mar. 4, 2011.

(51) Int. Cl.
*B60C 5/00* (2006.01)
(52) U.S. Cl.
USPC ......... 152/450; 152/203; 152/205; 156/394.1

(58) Field of Classification Search
USPC ................... 152/152, 203, 205–207
See application file for complete search history.

(56) References Cited

U.S. PATENT DOCUMENTS

| | | | |
|---|---|---|---|
| 5,392,838 A | 2/1995 | Bijaoui et al. | |
| 5,785,779 A | 7/1998 | McGee et al. | |
| 6,877,537 B1 | 4/2005 | Crow | |
| 2003/0000615 A1 * | 1/2003 | Volpi | 152/152.1 |
| 2003/0000619 A1 | 1/2003 | Nakamura et al. | |
| 2010/0291382 A1 | 11/2010 | Van Ooij et al. | |

FOREIGN PATENT DOCUMENTS

WO 0218158 3/2002

* cited by examiner

*Primary Examiner* — Justin Fischer
*Assistant Examiner* — James Bermingham
(74) *Attorney, Agent, or Firm* — Grossman, Tucker, Perreault & Pfleger, PLLC (57) ABSTRACT

A tire and methods of manufacture thereof comprising a tire body and a metal reinforcing strip comprising at least one metal alloy foil layer to provide puncture resistance, wherein the at least one metal alloy foil layer comprises a spinodal glass matrix microconstituent structure.

20 Claims, 4 Drawing Sheets

PUNCTURE RESISTANT TIRE

CROSS REFERENCE TO RELATED APPLICATIONS

This application claims priority to U.S. provisional patent application No. 61/449,335 filed Mar. 4, 2011, the teachings of which are incorporated herein by reference.

FIELD OF INVENTION

The present application relates to a puncture resistant bicycle tire and, in particular, bicycle tires incorporating one or more layers of metal alloy foil exhibiting spinodal glass matrix microconstituents.

BACKGROUND

Materials generally used in bicycle tires for puncture resistance include relatively high strength multifilament woven yarns of fibrous materials such as nylon, para-aramids (e.g., KEVLAR), and liquid crystal polymers (e.g., VECTRAN). The individual filaments in the woven multifilament yarn fabrics can move laterally (i.e., side to side between the side walls) as an object is forced between the filaments piercing the fabric. While some foreign objects may be large enough so as not to be able to penetrate the weave of the polymeric fabric, other foreign objects may exhibit dimensions that are relatively small, particularly in the lateral dimension, and may be more easily be forced through the weave of the filaments and pierce the tire tube.

Aluminum and titanium foil strips have also been incorporated in bicycle tires due to their relatively low densities, in an effort to keep the overall weight of the tires low. However, aluminum is relatively soft. In addition, titanium, while relatively harder than aluminum, is of relatively greater expense, limiting its use. Still, these materials may exhibit relatively low elasticity of approximately 0.2% (i.e. the amount of strain that the material may undergo without plastic deformation). The elastic limit of these metals may be overcome when hard impacts or foreign objects are encountered and plastic deformation of the metals may reduce ride performance and durability of the tire. Accordingly, there remains a need to provide a puncture resistant tire that prevents foreign objects of various sizes from penetrating the tire and piercing the tire tube.

SUMMARY

A tire is provided comprising a tire body, a metal reinforcing strip comprising at least one metal alloy foil layer to provide puncture resistance, wherein the at least one metal alloy foil layer comprises a spinodal glass matrix microconstituent structure. The tire may be a bicycle tire.

The tire may further comprise a tire body, and a metal reinforcing strip comprising at least one metal alloy foil layer to provide puncture resistance, wherein the at least one metal alloy foil layer comprises a spinodal glass matrix microconstituent structure characterized by the presence of two or more metal compositions separated into distinct phases with different chemical compositions and the phases include one or more semicrystalline clusters having a largest linear dimension of 2 nm or less and one or more crystalline clusters having a largest linear dimension of greater than 2 nm.

In certain embodiments, the metal alloy may comprise an Fe based alloy including Fe at a level of greater than 35-92 atomic percent, Ni at a level of 4-40 atomic percent, B at a level of 7-25 atomic percent. In other embodiments, the metal alloy may comprise an Fe based alloy including Fe at a level of greater than 35-92 atomic percent, Ni at a level of 4-40 atomic percent, B at a level of 7-25 atomic percent, Si at a level of 0.3-8 atomic percent and Cr at a level of 0.1-25 atomic percent.

In certain embodiments, the at least one metal alloy foil layer may include metallic glass and the size of the structural units in the metallic glass in the range of 5 Angstroms to 100 Angstroms.

In certain embodiments, the spinodal glass matrix microconstituent structure may be present in a range of 5% to 95% by volume of the metal alloy foil layer.

In certain embodiments, the at least one metal alloy foil layer may be provided by a metal alloy composition having at least one of the following properties: microhardness in a range of 850 HV to 950 HV; a percent elongation at break at a strain rate of $0.001$ $s^{-1}$ in a range of 1.5% to 5.0%; a moduli of elasticity at a strain rate of $0.001$ $s^{-1}$ in a range of 140 GPa to 170 GPa; an ultimate tensile strength at a strain rate of $0.001$ $s^{-1}$ in a range of 1500 MPa to 3000 MPa; and a yield strength at a strain rate of $0.001$ $s^{-1}$ in a range of 1200 MPa to 2000 MPa.

In certain embodiments, the metal reinforcing strip may comprise a plurality of metal alloy foil layers. The plurality of metal alloy foil layers may comprise a plurality of metal alloy foil layers which each comprise a spinodal glass matrix microconstituent structure.

In certain embodiments, the metal reinforcing strip may be arranged around a circumference of the tire body. The metal reinforcing strip may be located underneath a tread of the tire body, or embedded in the tire body. The metal reinforcing strip may be positioned on an inner surface of the tire body. The metal foil has a thickness in a range of 0.01 mm to 0.1 mm.

In certain embodiments, a method of providing a tire may comprise providing a tire body; and providing a metal reinforcing strip comprising at least one metal alloy foil layer to provide puncture resistance, wherein the at least one metal alloy foil layer comprises a spinodal glass matrix microconstituent structure characterized by the presence of two or more metal compositions separated into distinct phases with different chemical compositions and the phases include one or more semicrystalline clusters having a largest linear dimension of 2 nm or less and one or more crystalline clusters having a largest linear dimension of greater than 2 nm; and wherein the metal reinforcing strip is embedded in the tire body.

In certain embodiments, a method of providing a tire may comprise providing a tire body; and providing a metal reinforcing strip comprising at least one metal alloy foil layer to provide puncture resistance, wherein the at least one metal alloy foil layer comprises a spinodal glass matrix microconstituent structure characterized by the presence of two or more metal compositions separated into distinct phases with different chemical compositions and the phases include one or more semicrystalline clusters having a largest linear dimension of 2 nm or less and one or more crystalline clusters having a largest linear dimension of greater than 2 nm; and wherein the metal reinforcing strip is positioned on an inner surface of the tire body.

BRIEF DESCRIPTION OF DRAWINGS

The above mentioned and other features of this disclosure, and the manner of attaining them, may become more apparent and better understood by reference to the following description of embodiments described herein taken in conjunction with the accompanying drawings, wherein.

DETAILED DESCRIPTION

The present application relates to a puncture resistant bicycle tire. The bicycle tire may incorporate a strip of one or more layers of metal alloy foil exhibiting spinodal glass matrix microconstituents. In some embodiments, the metal alloy foil strip may either be embedded within the tire or between the tire and tube.

Figure 1:
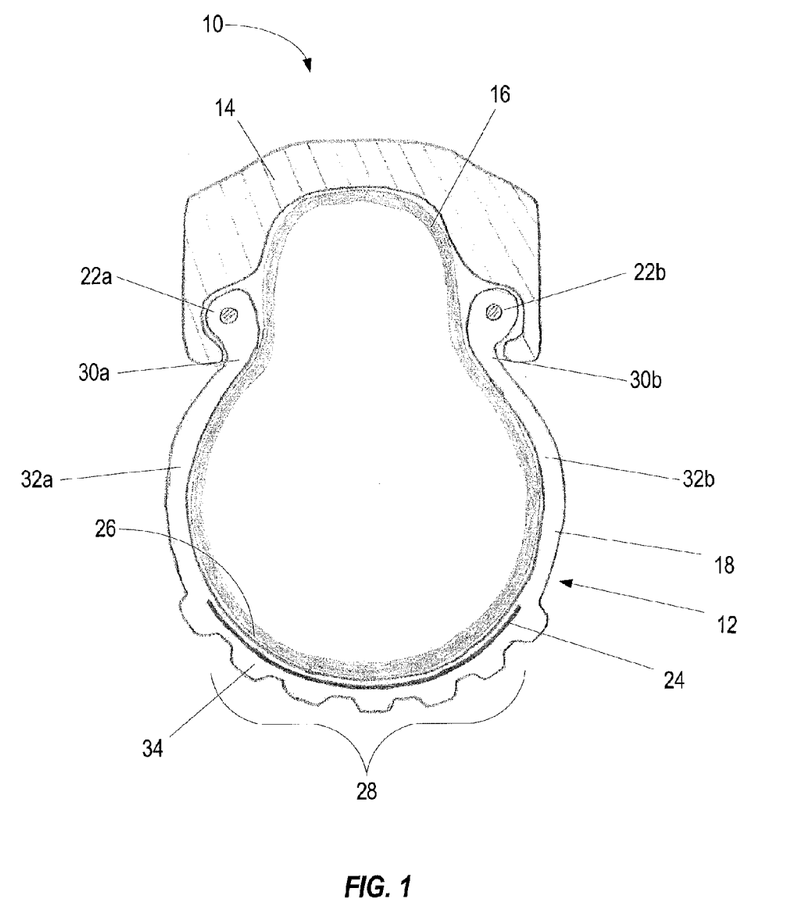
FIG. 1 illustrates a cross-sectional view of one embodiment of a tire construction including a metal foil embedded in the tire.

FIG. 1 illustrates a cross-section of an embodiment of a bicycle wheel including one or more layers of a metal alloy foil, described further herein, embedded in the bicycle tire. As illustrated the wheel 10 includes a tire 12 having a tire body 18 affixed to a wheel rim 14. Retained within the wheel rim 14 and the tire 12 is the tube 16. The tire body 18 of the tire 12 may include retention features 22a, 22b, such as beads and embedded cords, for retaining the tire 12 within the wheel rim 14.

A metal alloy foil strip 24 may be embedded within the tire body 18 of the tire 12 underneath the inner surface 26 of the tire. The metal alloy foil strip 24 may be provided along a portion 28 of the tire 12 that may be most apt to touching the ground or another surface, as illustrated. The metal foil strip 24 may also extend proximate to the wheel rim on one or both sides of the tire 12 to a location 30a, 30b adjacent retention features 22a, 22b along the side walls 32a, 32b. In addition, tread 34 may be provided near the "contact surface" 28 of the tire. The tread 34 may either be integral to the body 18 of the tire 12 or may be a second piece thermally, chemically and/or mechanically affixed to the body 18 of the tire 12.

Figure 2:
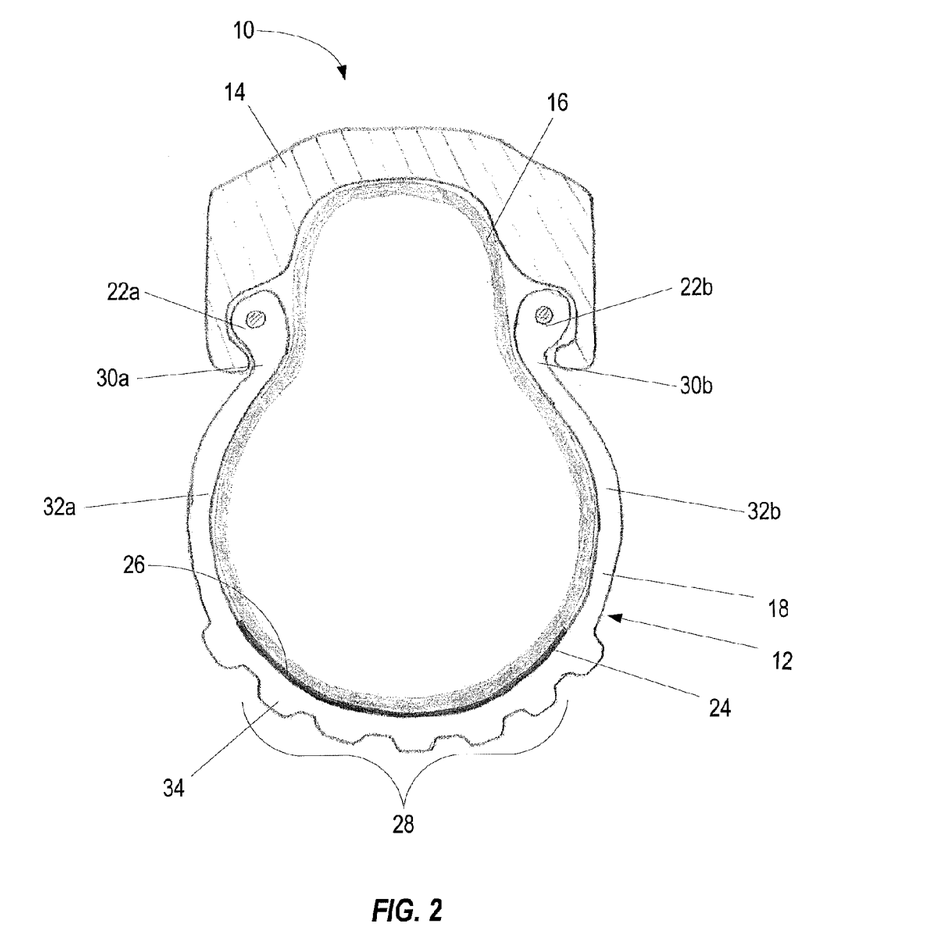
FIG. 2 illustrates a cross-sectional view of another embodiment of a tire construction including a metal foil disposed between the tire and tube.

FIG. 2 illustrates a cross-section of another embodiment of a bicycle wheel including one or more layers of a metal alloy foil, described further herein, positioned on the inner surface of the bicycle tire. As illustrated, the wheel 10 includes a tire 12 affixed to a wheel rim 14. Retained within the wheel rim 14 and the tire 12 is the tube 16. The tire body 18 of the tire 12 may include retention features 22a, 22b for retaining the tire 12 within the wheel rim 14. A metal alloy foil strip 24 may be retained on the inner surface 26 the tire body 18 of the tire 12. The metal alloy foil strip 24 may be provided along a portion 28 of the tire 12 that may be most apt to touching the ground or another surface, as illustrated, or may extend proximate to the wheel rim on one or both opposing sides of the tire 12 to a location 30a, 30b adjacent retention features 22a, 22b along the side walls 32a, 32b. In some embodiments, the metal alloy strip 24 may be positioned between the inner surface 26 of the tire body 18 of tire 12 and the tube 16, wherein the metal alloy strip 24 may be retained by the pressure asserted by the tube 16 against the tire body 18 of tire 12 when the tube 16 is inflated.

In other embodiments, the metal alloy foil strip 24 may be retained on the inner surface 26 by an adhesive or an adhesive tape applied between the foil strip 24 and the inner surface 26. An adhesive tape may also be provided over the metal foil strip 24, such that the tube 16 contacts the adhesive tape rather than the metal foil strip 24. In further embodiments the metal alloy foil strip 24 may be retained on the inner surface 26 of the tire body 18 of tire 12 by a mechanical retainer, such as a lip, that may surround a portion of the perimeter of the foil strip 24. In addition, tread 34 may be provided near the "contact surface" 28 of the tire. The tread 34 may either be integral to the body 18 of the tire 12 or may be a second piece thermally, chemically and/or mechanically affixed to the body 18 of the tire 12.

The metal alloy foil strips may be formed from metal alloy compositions that exhibit spinodal glass matrix microconstituents, which includes metallic glasses. Spinodal Glass Matrix Microconstituent (i.e. SGMM) may enable the achievement of ductility ($\geq$1% elongation) arising from the ability to blunt moving shear bands (i.e. ISBB) through specific microstructural interactions at the nanoscale called Localized Deformation Induced Changes (LDIC). Subsequent second level and higher arresting shear band interactions (SBAI), may allow the achievement of relatively high shear band densities under unconstrained loading and may lead to increased levels of global plasticity. Moreover, the result of this SBAI may include the development of a strain hardening effect which means that the active ductility mechanisms may be usable and relevant to industrial processing and applications where defects and the associated stress concentration sites will always be present. The chemistries described herein may achieve the formation of spinodal glass matrix microconstituents at a relatively lower cost and may therefore enhance the price/performance benefits to enable an expanded range of commercial markets for materials that include spinodal glass matrix microconstituents.

Accordingly, the metal alloy compositions for forming the metal alloy foil strips may include glass forming chemistries which may lead to Spinodal Glass Matrix Microconstituent (SGMM) structures, which may exhibit relatively significant ductility and high tensile strength. Spinodal glass matrix microconstituents may be understood as microconstituents formed by a transformation mechanism that is not nucleation controlled. More basically, spinodal decomposition may be understood as a mechanism by which a solution of two or more components (e.g. metal compositions) of the alloy can separate into distinct regions (or phases) with distinctly different chemical compositions and physical properties. This mechanism differs from classical nucleation in that phase separation occurs uniformly throughout the material and not just at discrete nucleation sites. The phases may include one or more semicrystalline clusters or crystalline phases, which may therefore form through a successive diffusion of atoms on a local level until the chemistry fluctuations lead to at least one distinct crystalline phase. Semi-crystalline clusters may be understood herein as exhibiting a largest linear dimension of 2 nm or less, whereas crystalline clusters may exhibit a largest linear dimension of greater than 2 nm. Note that during the early stages of the spinodal decomposition, the clusters which are formed may be relatively small and while their chemistry differs from a surrounding glass matrix, they are not yet fully crystalline and have not yet achieved well ordered crystalline periodicity. Additional crystalline phases may exhibit the same crystal structure or distinct structures.

Furthermore, as noted, the phases may include a glass matrix or metallic glass. Metallic glass may be understood to include microstructures that may exhibit associations of structural units in the solid phase that may be randomly packed together. The level of refinement, or the size, of the structural units in the glass phase may be in the angstrom scale range (i.e. 5 Å to 100 Å). Metallic glasses may be understood as a relatively unique class of materials that may exhibit characteristics which are both metal like, (since they may contain non-directional metallic bonds, metallic luster, and/or relatively significant electrical and thermal conductivity), and ceramic like (since relatively high hardness may often be exhibited coupled with brittleness and the lack of tensile ductility). Metallic glasses may be understood to include supercooled liquids that exist in solid form at room temperature but which may have structures that are similar to what is found in the liquid with only short range order present. Metallic glasses may generally have free electrons, exhibit metallic luster, and exhibit metallic bonding similar to what is found in conventional metals. Metallic glasses may be metastable materials and when heated up, they may transform into a crystalline state. The process is called crystallization or devitrification. Since diffusion is limited at room temperature, enough heat (i.e. Boltzman's Energy) may be applied to overcome the nucleation barrier to cause a solid-solid state transformation which is caused by glass devitrification.

The devitrification temperature of metallic glasses can vary widely and may be, for example, in the range of 300° C. to 800° C. with enthalpies of crystallization commonly from −25 J/g to −250 J/g. The devitrification process can occur in one or multiple stages. When occurring in multiple stages, a crystalline phase may be formed and then depending on the specific partition coefficient, atoms may either be attracted to the new crystallites or rejected into the remaining volume of the glass. This may result in more stable glass chemistry which may necessitate additional heat input to cause partial or full devitrification. Thus, partially devitrified structures may result in crystalline precipitates in a glass matrix. Commonly, these precipitates may be in the size range of 30 nm to 125 nm. Full devitrification to a completely crystalline state may result from heat treating above the highest temperature glass peak which can be revealed through thermal analysis such as differential scanning calorimetry or differential thermal analysis.

The relatively fine length scale of the structural order, (i.e. molecular associations), and near defect free nature of the material, (i.e. no 1-d dislocation or 2-d grain/phase boundary defects), may provide relatively high strength, (and corresponding hardness), which may be on the order of 33% to 45% of theoretical. However, due to the lack of crystallinity, dislocations may not be found and a mechanism for significant (i.e. >1%) tensile elongation may not be apparent. Metallic glasses may exhibit limited fracture toughness associated with the relatively rapid propagation of shear bands and/or cracks which may be a concern for the technological utilization of these materials. While these materials may show adequate ductility when tested in compression, when tested in tension they exhibit elongation very close to zero and fracture in the brittle manner. The inherent inability of these classes of materials to deform in tension at room temperature may be a limiting factor for all potential structural applications where intrinsic ductility is needed to avoid catastrophic failure. Owing to strain softening and/or thermal softening, plastic deformation of metallic glasses may be relatively highly localized into shear bands, resulting in a limited plastic strain (exhibiting less than 1% elongation) and catastrophic failure at room temperature.

In addition, the spinodal glass matrix microconstituent (SGMM) may enable the metal alloys herein to exhibit Induced Shear Band Blunting (ISBB) and Shear Band Arresting Interactions (SBAI). ISBB may be understood as the ability to blunt and stop propagating shear bands through interactions with the SGMM structure. SBAI may be understood as the arresting of shear bands through shear band/shear band interactions and may occur after the initial or primary shear bands are blunted through ISBB.

While conventional materials may deform through dislocations moving on specific slip systems in crystalline metals, ISBB and SBAI deformation mechanisms may involve moving shear bands (i.e., discontinuities where localized deformation occurs) in a spinodal glass matrix microconstituent, which are blunted by localized deformation induced changes (LDIC) described further herein. With increasing levels of stress, once a shear band is blunted, new shear bands may be nucleated and then interact with existing shear bands creating relatively high shear band densities in tension and the development of relatively significant levels of global plasticity. Thus, the alloys with favorable SGMM structures may prevent or mitigate shear band propagation in tension, which may result in relatively significant tensile ductility (>1%) and lead to strain hardening during tensile testing. The alloys contemplated herein may include or consist of chemistries capable of forming a spinodal glass matrix microconstituent, wherein the spinodal glass matrix microconstituents may be present in the range of 5 to 95% by volume, including glassy, semi-crystalline, and/or crystalline phases.

Glass forming chemistries that may be used to form the metal alloys including the spinodal glass matrix microconstituent structures herein may include certain iron based glass forming alloys, which are then processed to provide the SGMM structures noted herein. The iron based alloys may include iron present at levels of greater than 35 atomic %. In addition, the alloys may include the elements iron, nickel, boron. In some embodiments, the alloys may include, be limited to, or consist essentially of iron, nickel, boron, and cobalt. In some embodiments, the alloys may include, be limited to, or consist essentially of iron, nickel, boron, cobalt, and silicon. In some embodiments, the alloys may include, be limited to, or consist essentially of iron, nickel, boron, cobalt, carbon and silicon. In further embodiments, the above alloys may also include one or more of chromium, titanium, molybdenum, aluminum, copper, cerium, tungsten, chromium and yttrium.

In some embodiments, iron may be present in the range of 35 atomic percent to 92 atomic percent, including all values and ranges therein, such as individual values and ranges selected from 40 atomic percent to 70 atomic percent. Nickel may be present from 4 atomic percent to 40 atomic percent, including all values and ranges therein, such as individual values and ranges selected from 4 atomic percent to 30 atomic percent, 10 to 30 atomic percent or 13 atomic percent to 17 atomic percent. Boron may be present in the range of 7 atomic percent to 25 atomic percent, including all values and ranges therein, such as individual values and ranges selected from 10 atomic percent to 19 atomic percent or 12 atomic percent to 17 atomic percent. Cobalt, when present, may be present in the range of 1 atomic percent to 21 atomic percent, including all values and ranges therein, such as values and ranges selected from 2 atomic percent to 12 atomic percent or 1 atomic percent to 5 atomic percent. Carbon, when present, may be present in the range of 0.1 atomic percent to 6 atomic percent including all values and ranges therein, such as values and ranges selected from 1 atomic percent to 5 atomic percent. Silicon, when present, 0.3 atomic percent to 8 atomic percent including all values and ranges therein, such as values and ranges selected from 0.4 atomic percent to 4 atomic percent. Titanium, when present, may be present up to 25 atomic percent, including all values and ranges therein, such as values and ranges selected from 1 atomic percent to 20 atomic percent or 1 atomic percent to 8 atomic percent. Molybdenum, when present, may be present up to 25 atomic percent, including all values and ranges therein, such as values and ranges selected from 1 atomic percent to 20 atomic percent or 1 atomic percent to 8 atomic percent. Aluminum, when present, may be present up to 25 atomic percent, including all values and ranges therein, such as values and ranges selected from 1 atomic percent to 20 atomic percent or 2 atomic percent to 16 atomic percent. Copper, when present, may be present up to 25 atomic percent, including all values and ranges therein, such as values and ranges selected from 1 atomic percent to 25 atomic percent. Cerium, when present, may be present from 1 atomic percent to 8 atomic percent, including all values and ranges therein. Tungsten, when present, may be present up to 25 atomic percent, including all values and ranges therein, such as individual values and ranges selected from 0.1 atomic percent to 25 atomic percent. Chromium, when present, may be present up to 25 atomic percent, including all values and ranges therein, such as 0.1 atomic percent to 25 atomic percent or 2 atomic percent to 3 atomic percent. Yttrium, when present, may be present up to 25 atomic percent, including all values and ranges therein, such as from 0.1 atomic percent to 25 atomic percent.

| Alloy | Fe | Ni | B | Si | Cr |
|---|---|---|---|---|---|
| Alloy 1 | 64.97 | 16.49 | 14.99 | 0.46 | 3.09 |
| Alloy 2 | 62.83 | 10.00 | 13.40 | 0.42 | 13.35 |

Due to, for example, the purity of the feedstock and introduction of impurities during processing, the alloys may include up to 3 atomic percent of impurities. In addition, the above described iron based alloy compositions described above may be present in the range of 90 atomic percent to 100 atomic percent of a larger metal alloy composition, including all values and increments therein, such as in the range of 90 atomic percent to 99 atomic percent, etc.

While not intended to be limiting, an analysis of the mechanisms of deformation appear to show that that the operating mechanisms for ISBB and SBAI are orders of magnitude smaller than the system size. The operable system size may be understood as the volume of material containing the SGMM structure, which again may be in the range of 5% to 95% by volume. Additionally, for a liquid melt cooling on a chill surface such as a wheel or roller (which can be as wide as engineering will allow) 2-dimensional cooling may be a predominant factor in spinodal glass matrix microconstituent formation, thus the thickness may be a limiting factor on structure formation and resulting operable system size. At thicknesses above a reasonable system size compared to the mechanism size, the ductility mechanism may be unaffected. For example, the shear band widths may be relatively small (10 to 100 nm) and even with the LDIC interactions with the structure the interaction size may be from 20 to 200 nm. Thus, for example, achievement of relatively significant ductility ($\geq$1%) at a 100 micron thickness means that the system thickness is already 500 to 10,000 times greater than ductility mechanism sizes.

It is contemplated that the operable system size, which when exceeded would allow for ISBB and SBAI interactions, may be in the range of ~10 nm to 1 micron in thickness and 1000 $nm^3$ to 1 $\mu m^3$ in volume. Achieving thicknesses greater ~1 micron or operable volumes greater 1 $\mu m^3$ may not be expected to significantly affect the operable mechanisms or achievement of significant levels of plasticity since the operable ductility mechanistic size is below this limit. Thus, greater thickness or greater volume samples or products would be contemplated to achieve an operable ductility with ISBB and SBAI mechanisms in a similar fashion as identified as long as the SGMM structure is formed.

Manufacturing of the metal alloy foil may be performed using techniques that may result in cooling rates sufficient to provide the SGMM structures. Such cooling rates may be in the range of $10^3$ to $10^6$ K/s. Examples of processing techniques that may be configured to provide the SGMM structures herein and associated plasticity may include, but are not limited to, melt-spinning/jet casting, planar flow casting, and twin roll casting. Additional details of these manufacturing techniques, operating in a manner to provide the structures and resulting properties presented in this application herein, are included below.

Melt spinning may be understood to include a liquid melt ejected using gas pressure onto a rapidly moving copper wheel. Continuous or broken up lengths of ribbon may be produced. In some embodiments, the ribbon may be in the range of 1 mm to 2 mm wide and 0.015 to 0.15 mm thick, including all values and increments therein. The width and thickness may depend on the melt spun materials viscosity and surface tension and the wheel tangential velocity. Typical cooling rates in the melt-spinning process may be from ~$10^4$ to ~$10^6$ K/s, including all values and increments therein. Ribbons may generally be produced in a continuous fashion up to 25 m long using a laboratory scale system.

Jet casters may be used to melt-spin alloys on a commercial scale. Process parameters in one embodiment of melt spinning may include providing the liquid melt in a chamber, which is in an environment including air or an inert gas, such as helium, carbon dioxide, carbon dioxide and carbon monoxide mixtures, or carbon dioxide and argon mixtures. The chamber pressure may be in the range of 0.25 atm to 1 atm, including all values and increments therein. Further, the casting wheel tangential velocity may be in the range of 15 meters per second (m/s) to 30 m/s, including all values and increments therein. Resulting ejection pressures may be in the range of 100 to 300 mbar and resulting ejection temperatures may be in the range of 1000° C. to 1300° C., including all values and increments therein.

Planar flow casting may be understood as a relatively low cost and relatively high volume technique to produce wide ribbon in the form of continuous sheet. The process may include flowing a liquid melt at a close distance over a chill surface. Widths of thin foil/sheet up to 18.4" (215 mm), including all values and increments in the range of 10 mm to 215 mm, may be produced on a commercial scale with thickness in the range of 0.016 to 0.075 mm, including all values and increments therein. Cooling rates in the range of ~$10^4$ to ~$10^6$ K/s, including all values and increments therein may be provided. After production of sheets, the individual sheets (from 5 to 50) may be warm pressed to roll bond the compacts into sheets.

Twin roll casting may be understood to include quenching a liquid melt between two rollers rotating in opposite directions. Solidification may begin at first contact between the upper part of each of the rolls and the liquid melt. Two individual shells may begin to form on each chill surface and, as the process continues, may be subsequently brought together at the roll nip by the chill rolls to form one continuous sheet. In this approach, solidification may occur rapidly and direct melt thicknesses may be achieved much thinner than conventional melt processes and typically into the 1.5 mm to 3.0 mm range prior to any post processing steps such as hot rolling. The process may be similar in many ways to planar flow casting, yet a main difference is that two chill rollers may used to produce sheet in twin roll casting rather than a single chill roller in planar flow casting. However, in the context of the sheet that may be produced herein, having the indicated SGMM structure, the thickness may be in the range of 0.5 mm to 5.0 mm.

The metal alloys may exhibit a density, in ingot form as measured by the Archimedes method, in the range of 7.0 grams/cubic centimeter to 8.0 grams/cubic centimeter, including all values and ranges therein. The metal alloys may exhibit a relatively high microhardness of 850 HV or greater. In some embodiments, the microhardness may be in the range of 850 HV to 950 HV including all values and ranges therein, such as 900 HV. Microhardness may be understood as hardness measured using a Vickers indenter at a constant load of 50 g with at least 10 measurements per sample.

The metal alloy may exhibit an ultimate tensile strength of 1500 MPa or greater. In some embodiments, the metal alloys may exhibit an ultimate tensile strength in the range of 1500 MPa to 3000 MPa, including all values and ranges therein, at a strain rate of $0.001\ s^{-1}$. The metal alloys may also exhibit yield strength of 1200 MPa or greater. In some embodiments, the yield strength may be in the range of 1200 MPa to 2000 MPa, including all values and ranges therein, such as 1.3 GPa, at a strain rate of $0.001\ s^{-1}$. The metal alloys may further exhibit a percent elongation at break of 1.5% or greater. In some embodiments, the percent elongation may be in the range of 1.5% to 5.0%, including all values and increments therein, at a strain rate of $0.001\ s^{-1}$. Further, the modulus of elasticity of these materials may be in the range of 140 GPa to 170 GPa, including all values and ranges therein, at a strain rate of $0.001\ s^{-1}$. These mechanical properties of the metallic ribbons may be determined at room temperature using microscale tensile testing. The testing may be carried out in a commercial tensile stage made by Ernest Fullam Inc. which was monitored and controlled by a MTEST Windows software program, or using similar testing set-ups. The deformation may be applied by a stepping motor through the gripping system while the load was measured by a load cell that was connected to the end of one gripping jaw. Displacement may be obtained using a Linear Variable Differential Transformer (LVDT) which was attached to the two gripping jaws to measure the change of gage length. Before testing, the thickness and width of a ribbon tensile specimen may be carefully measured at least three times at different locations in the gage length. The average values may then be recorded as gage thickness and width, and used as input parameters for subsequent stress and strain calculation. The initial gage length for tensile testing may be set at ~7 to ~9 mm with the exact value determined after the ribbon was fixed, by accurately measuring the ribbon span between the front faces of the two gripping jaws. All tests may be performed under displacement control, with a strain rate of $~0.001\ s^{-1}$. Elastic strain, total elongation, yield strength, ultimate tensile strength, and Young's Modulus may be calculated by a MTEST Windows software program at each test. The thermal conductivity of the metal alloys may be in the range of 5 W/m*K to 25 W/m*K, including all values and ranges therein, and the coefficient of thermal conductivity may be in the range of 12 micrometers per meter of length (ppm)/° C. to 15 ppm/° C.

Once the foils are formed, one or more metal alloy foils may be provided to form the metal alloy strips. The total thickness of the metal alloy strip including one or more metal foil layers may be in the range of 0.010 mm to 0.100 mm in thickness, including all values and ranges therein, such as a thickness selected from the range of 0.010 mm to 0.070 mm. Where more than one foil layer may be provided, each layer may be 0.010 to 0.050 mm in thickness, including all values and ranges therein. In addition, where more than one foil layer is present, 2 or more foil layers may be present. Multiple foil layers may be adhered together forming a laminate. Metal alloy strips of the metal alloys described herein may be incorporated into the wheel, as illustrated in FIGS. 1 and 2, wherein the metal alloys strip may be embedded within the tire or may be positioned on the inner surface of the tire.

Figure 3:
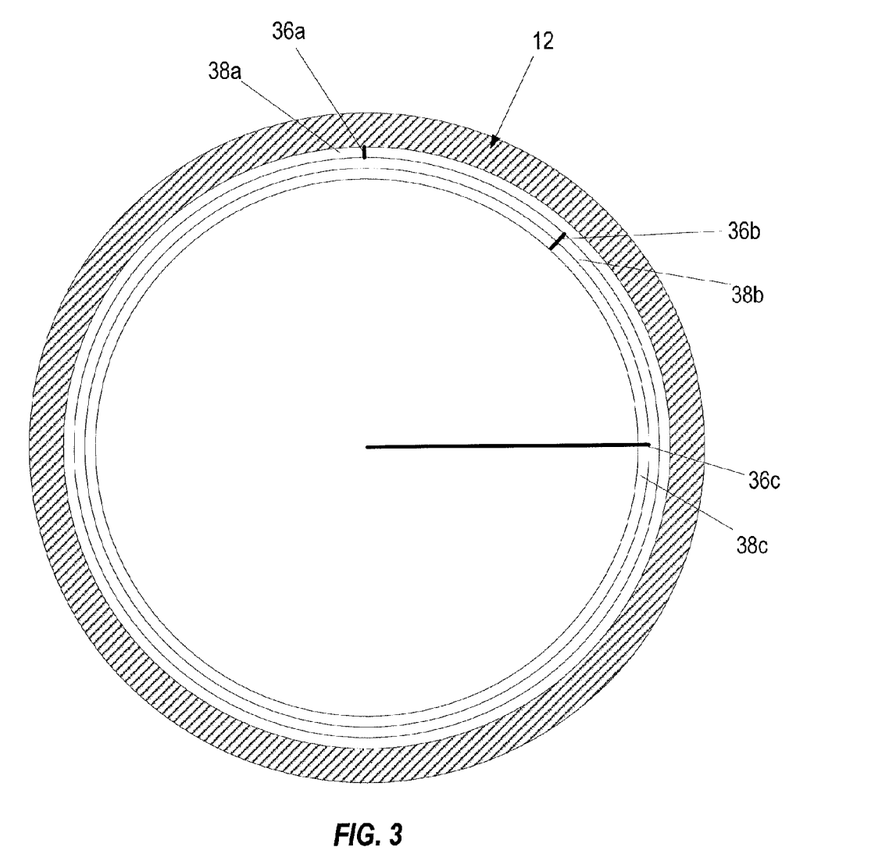
FIG. 3 illustrates a cross-sectional view of an embodiment of a tire perpendicular to the axis of rotation including a number of metal alloy foil layers in a metal alloy strip.

In some embodiments, the metal alloy strip may be continuous around the circumference of the tire. Where multiple layers of foil may be present, as illustrated in FIG. 3, the meeting location of the ends 36a, 36b, 36c of the foils 38a, 38b, 38c in the strip 24 may be spaced apart so that all of the ends of all the foil layers do not fall at the same location on the tire 12. In other embodiments, the metal alloy strip may be a series of discontinuous strips applied at various intervals around the inner circumference of the tire. The discontinuous strips may overlay or may be spaced apart. In addition, as alluded to above, the metal alloy strip may be formed from one layer or from multiple layers stacked together to form a laminate. Adhesive materials maybe applied between the various laminate layers or the layers may be otherwise tacked or bonded together.

In some embodiments, where the metal alloy strip 24 is embedded in the tire body 18 of tire 12, as illustrated in FIG. 1, the strip may be incorporated into the tire when the tire is being formed. For example, the composition forming the tire body 18 may be formed around the strip 24, embedding the strip 24 within the tire body 18. In another example, the metal strip may be placed between two portions of the tire and the tire may be affixed together. A first portion of the tire may be formed, the strip may be placed on the first portion and a second portion of the tire may be provided or formed over the strip and/or the first portion of the tire embedding the strip between the two portions. Adhesive may be applied to the strip or first portion of the tire to retain the strip before the second portion of the tire is formed or adhesive may be applied the second portion of the tire.

In other embodiments, where the metal alloy strip is retained between the tire and the tube, as illustrated in FIG. 2, the tire may be first molded and then the strip may be positioned on the inner surface of the tire body 18 of tire 12. An adhesive may be applied to retain the strip. The adhesive may be applied between the tire and the strip as a liquid or a gum or may be applied as adhesive tape over the strip, contacting the tire around the periphery of the metal alloy strip.

The metal strip may also be treated or otherwise functionalized to improve the adhesion between the metal strip and the composition forming the tire. For example, a coating may be applied to the metal strip. The coating may include silane compositions, such as those disclosed in disclosed in U.S. Application No. 2010/0291382, the teachings of which are incorporated herein by reference. Other compositions may include metal salts of acrylic and methacrylic acids; multifunctional monomers, such as diacrylates, dimethacrylated and monomethacrylates, which may be available, for example, from Cray Valley, of Exton, Pa.

Figure 4:
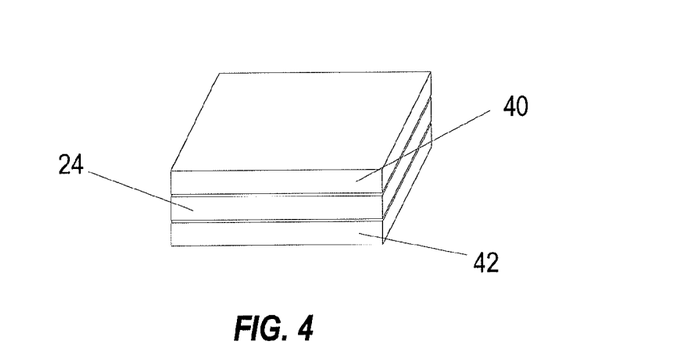
FIG. 4 illustrates an embodiment of a metal alloy strip including wear resistant coating layers.
Figure 5:
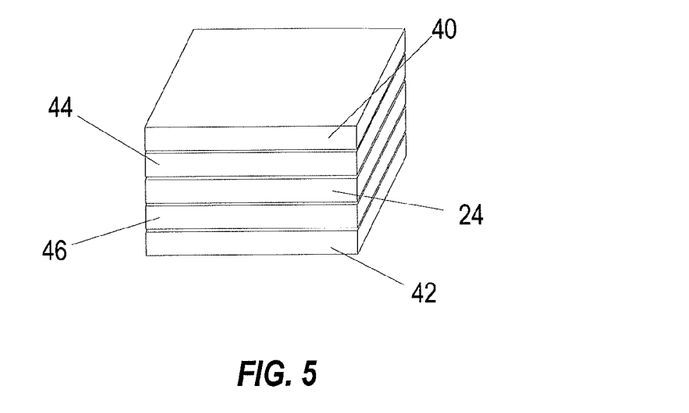
FIG. 5 illustrates another embodiment of a metal alloy strip including wear resistant coating layers.

One or more wear resistant layers may also be provided to prevent the metal alloy strip from wearing into the tire, the tube or both. FIG. 4 illustrates an example of wear resistant layers 40, 42 formed over the metal alloy strip 24. Adhesive layers 44, 46 may be provided between the wear resistant layers 40, 42 to chemically or mechanically bond the metal alloys strip 24 to the wear resistant layers 40, 42 as is shown in FIG. 5. The wear resistant layers may be formed from films including films formed from thermoplastic materials or woven fabric or nonwoven fabrics formed from natural fibers, synthetic fibers or both. Thermoplastic materials may include polyolefins such as polyethylene or polypropylene, fluoropolymers, polyester, polyether ether ketone, etc. Natural fibers may include cotton, cellulose, etc. Synthetic fibers may include polyolefin fibers such as polyethylene fibers, polypropylene fibers, polyester fibers, aramid fibers, etc. The one or more wear resistant layers may be disposed over the metal alloy strip prior to incorporating the metal alloy strip into the tire, or the layers may be provided while incorporating the metal alloy strip into the tire.

In some embodiments, the wear resistant layers may be heat sealed over the metal alloy strip, around at least a portion of the periphery of the metal alloy strip, or around the entire periphery of the metal alloy strip. In such a manner, pressure and/or thermal energy may be provided to melt the wear resistant layers sufficient to get partial to complete melting of the films or fibers. A portion of the film or fiber of one wear resistant layer may commingle with the film or fiber of another wear resistant layer forming mechanical or chemical bonds.

As may be appreciated, the relatively high hardness of the metal alloy foil may further reduce the penetration of foreign objects, regardless of the dimensions of the foreign objects, as the strip may be unitary from side wall to side wall. In addition, relatively sharp foreign objects may be dulled when forced into the surface of the metal alloy foils, reducing the ability of the object to pierce the foil. Thus, the relatively thin metal foil may provide a relatively light weight solution to puncture resistance.

The metal alloy reinforcing strip may also reduce rolling resistance. Rolling resistance may be understood as resistance that occurs when a round object rolls on a flat surface. Rolling resistance may be caused by the deformation of the object, the surface or both. In rubber tires, hysteresis exhibited by the materials may be understood as a contributing factor to rolling resistance. It is contemplated that the metal alloy strip may reduce the deformation in the tire during rotation, thereby reducing rolling resistance, while still maintaining some degree of dampening (i.e. reduction in transfer of vibrations). Accordingly, the use of the metal alloy reinforcing strip of the present disclosure containing SGMM structure such as hardness values of 850 HV to 950 HV and percent elongations of 1.5% to 5.0% with moduli of elasticity of 140 GPa to 170 GPa provided unexpected advantages within the tire during rotational motion.

Furthermore, increased weight may also contribute to rolling resistance and, therefore, the reduced weight of the strip may also reduce rolling resistance. Bicycle tires of the present disclosure may exhibit the following typical tire weights included below in Table 1.

TABLE 1

Typical Tire Weights

| Tire type | ISO tire diameter [mm] | Weight range [g], typical | Weight savings [g] using SGMM |
|---|---|---|---|
| Road racing | 622 | 180-220 | 1-12 |
| Road city/touring | 622 | 400-700 | 1-12 |
| Mountain slick/semi-slick | 559 | 550-850 | 3-25 |
| Mountain cross-country | 559 | 500-700 | 3-25 |
| BMX | 406 | 500-650 | 2-20 |

Thus, the relatively thin metal foil including SGMM may provide a light weight solution to puncture resistance, which may also reduce the rolling resistance.

EXAMPLES

The examples herein are presented for purposes of illustration and are not meant to limit the scope of the description and claims appended hereto.

Example 1

Table 2 provides a comparison of the difference in weight between the metal alloys described herein and examples of alternative materials aimed at increasing puncture resistance. Samples 1 through 4 are directed to the metal alloy strips at one inch widths. Samples 5 through 9 include the compositions described in WO 02/18158. Samples 10 and 11 include woven VECTRAN and aramid fibers (available from SPINSKINS under the model name RACE) and woven industrial fibers (again available from SPINSKINS under the model name DURO). Samples 12 through 15 include aluminum and polyurethane at a one inch width as described in U.S. Pat. No. 6,877,637. The weight is that of a strip material that may be employed in a typical tire, i.e., a 700 centimeter diameter tire (ISO 23-622). The SGMM foil in Table 2 corresponds to Alloy 1 noted above.

TABLE 2

Weight Comparison

| Sample | Material | Foil Thickness [mm] | Weight [g/m²] |
|---|---|---|---|
| 1 | SGMM foil | 0.020 | 156 |
| 2 | SGMM foil | 0.030 | 234 |
| 3 | SGMM foil | 0.040 | 312 |
| 4 | SGMM foil | 0.050 | 390 |
| 5 | Example 1 Fabric (WO 02/18158) | | 320 |
| 6 | Example 2 Fabric (WO 02/18158) | | 224 |
| 7 | Example 3 Fabric (WO 02/18158) | | 216 |
| 8 | Example 4 Fabric (WO 02/18158) | | 485 |
| 9 | Example 5 Fabric (WO 02/18158) | | 659 |
| 10 | SpinSkins Race | 0.737 | 310 |
| 11 | SpinSkins Duro | 0.559 | 374 |
| 12 | Aluminum + 0.13 mm thick polyurethane per side | 0.305 | 581 |
| 13 | Aluminum + 0.13 mm thick polyurethane per side | 0.356 | 719 |
| 14 | Aluminum + 0.13 mm thick polyurethane per side | 0.457 | 994 |
| 15 | Aluminum + 0.13 mm thick polyurethane per side | 0.660 | 1545 |

It may be appreciated that a metal alloy foil strip with a thickness less than 0.0275 mm may exhibit a lower weight than any of the other materials shown in the table above.

What is claimed is:

1. A tire comprising:
   a tire body; and
   a metal reinforcing strip comprising at least one metal alloy foil layer to provide puncture resistance, wherein the at least one metal alloy foil layer comprises a spinodal glass matrix microconstituent structure characterized by the presence of two or more metal compositions separated into distinct phases with different chemical compositions and the phases include one or more semicrystalline clusters having a largest linear dimension of 2 nm or less and one or more crystalline clusters having a largest linear dimension of greater than 2 nm.

2. The tire of claim 1 wherein:
the metal alloy comprises an Fe based alloy including Fe at a level of greater than 35-92 atomic percent, Ni at a level of 4-40 atomic percent, B at a level of 7-25 atomic percent.

3. The tire of claim 1 wherein:
the metal alloy comprises an Fe based alloy including Fe at a level of greater than 35-92 atomic percent, Ni at a level of 4-40 atomic percent, B at a level of 7-25 atomic percent, Si at a level of 0.3-8 atomic percent and Cr at a level of 0.1-25 atomic percent.

4. The tire of claim 1 wherein:
the at least one metal alloy foil layer includes metallic glass and the size of the structural units in the metallic glass in the range of 5 Angstroms to 100 Angstroms.

5. The tire of claim 1 wherein:
the spinodal glass matrix microconstituent structure is present in a range of 5% to 95% by volume of the metal alloy foil layer.

6. The tire of claim 1 wherein:
the at least one metal alloy foil layer is provided by a metal alloy composition having a microhardness in a range of 850 HV to 950 HV.

7. The tire of claim 1 wherein:
the at least one metal alloy foil layer is provided by a metal alloy composition having a percent elongation at break at a strain rate of $0.001\ s^{-1}$ in a range of 1.5% to 5.0%.

8. The tire of claim 1 wherein:
the at least one metal alloy foil layer is provided by a metal alloy composition having a moduli of elasticity at a strain rate of $0.001\ s^{-1}$ in a range of 140 GPa to 170 GPa.

9. The tire of claim 1 wherein:
at least one metal alloy foil layer is provided by a metal alloy composition, having an ultimate tensile strength at a strain rate of $0.001\ s^{-1}$ in a range of 1500 MPa to 3000 MPa.

10. The tire of claim 1 wherein:
at least one metal alloy foil layer is provided by a metal alloy composition having a yield strength at a strain rate of $0.001\ s^{-1}$ in a range of 1200 MPa to 2000 MPa.

11. The tire of claim 1 wherein:
the metal reinforcing strip comprises a plurality of metal alloy foil layers.

12. The tire of claim 11 wherein:
the plurality of metal alloy foil layers comprise a plurality of metal alloy foil layers which each comprise a spinodal glass matrix microconstituent structure.

13. The tire of claim 1 wherein:
the metal reinforcing strip is arranged around a circumference of the tire body.

14. The tire of claim 1 wherein:
the metal reinforcing strip is located underneath a tread of the tire body.

15. The tire of claim 1 wherein:
the metal reinforcing strip is embedded in the tire body.

16. The tire of claim 1 wherein:
the metal reinforcing strip is positioned on an inner surface of the tire body.

17. The tire of claim 1 wherein:
the metal foil has a thickness in a range of 0.01 mm to 0.1 mm.

18. The tire of claim 1 further comprising:
a bicycle tire.

19. A method of providing a tire comprising:
providing a tire body;
providing a metal reinforcing strip comprising at least one metal alloy foil layer to provide puncture resistance, wherein the at least one metal alloy foil layer comprises a spinodal glass matrix microconstituent structure characterized by the presence of two or more metal compositions separated into distinct phases with different chemical compositions and the phases include one or more semicrystalline clusters having a largest linear dimension of 2 nm or less and one or more crystalline clusters having a largest linear dimension of greater than 2 nm; and
wherein the metal reinforcing strip is embedded in the tire body.

20. A method of providing a tire comprising:
providing a tire body;
providing a metal reinforcing strip comprising at least one metal alloy foil layer to provide puncture resistance, wherein the at least one metal alloy foil layer comprises a spinodal glass matrix microconstituent structure characterized by the presence of two or more metal compositions separated into distinct phases with different chemical compositions and the phases include one or more semicrystalline clusters having a largest linear dimension of 2 nm or less and one or more crystalline clusters having a largest linear dimension of greater than 2 nm; and
wherein the metal reinforcing strip is positioned on an inner surface of the tire body.

* * * * *